(12) United States Patent
Menage

(10) Patent No.: US 6,517,076 B1
(45) Date of Patent: Feb. 11, 2003

(54) SEALING METHOD, NEW SEAL FOR COMPONENTS OF FLUID TRANSFER SYSTEMS, ESPECIALLY TUBES, AND THEIR APPLICATIONS, ESPECIALLY IN PUMPS AND CIRCUITS FOR SPECIAL FLUIDS

(75) Inventor: Frederic S. Menage, Toronto (CA)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 0 days.

(21) Appl. No.: 09/544,406

(22) Filed: Apr. 6, 2000

(51) Int. Cl.[7] .............................................. F16L 17/00
(52) U.S. Cl. ....................... 277/314; 277/606; 277/608; 277/612; 277/617; 277/316; 251/332; 251/333
(58) Field of Search ................................. 277/602, 608, 277/612, 617, 314, 316; 251/332, 333, 334

(56) References Cited

U.S. PATENT DOCUMENTS

| | | | |
|---|---|---|---|
| 3,416,768 A | * | 12/1968 | Welch .......................... 251/332 |
| 3,945,390 A | * | 3/1976 | Huber .......................... 251/334 |
| 4,860,793 A | * | 8/1989 | Hartl .......................... 251/335.2 |
| 5,007,457 A | * | 4/1991 | Jones .......................... 251/333 |
| 5,180,195 A | | 1/1993 | Petroff et al. |
| 6,260,852 B1 | * | 7/2001 | Reineke ....................... 277/609 |

FOREIGN PATENT DOCUMENTS

| | | |
|---|---|---|
| CH | 377 691 A | 1/1963 |
| DE | DDR-GM 5784 U | 9/1958 |
| DE | DDR-GM 5785 U | 9/1958 |

\* cited by examiner

*Primary Examiner*—Anthony Knight
*Assistant Examiner*—E Peavey
(74) *Attorney, Agent, or Firm*—Volker R. Ulbrich, Esq.; Richard L. Sampson, Esq.

(57) ABSTRACT

The invention concerns a new seal system for resolving the problem of the contamination of special fluids carried in pumps and moreover providing improved sealing by virtue of its special geometry and design. According to the invention, one of the elements to be connected can replace the seal owing to the fact that the seal system includes a combination of two elements to be connected with a fine film ring, one of the elements to be connected having a geometry able to effect a double indentation on the film ring. The invention may be used in pumps and circuits for fluids of the semiconductor industry. The three elements of the seal system, including the pump body, tube, and film ring, may be made of PFA.

24 Claims, 4 Drawing Sheets

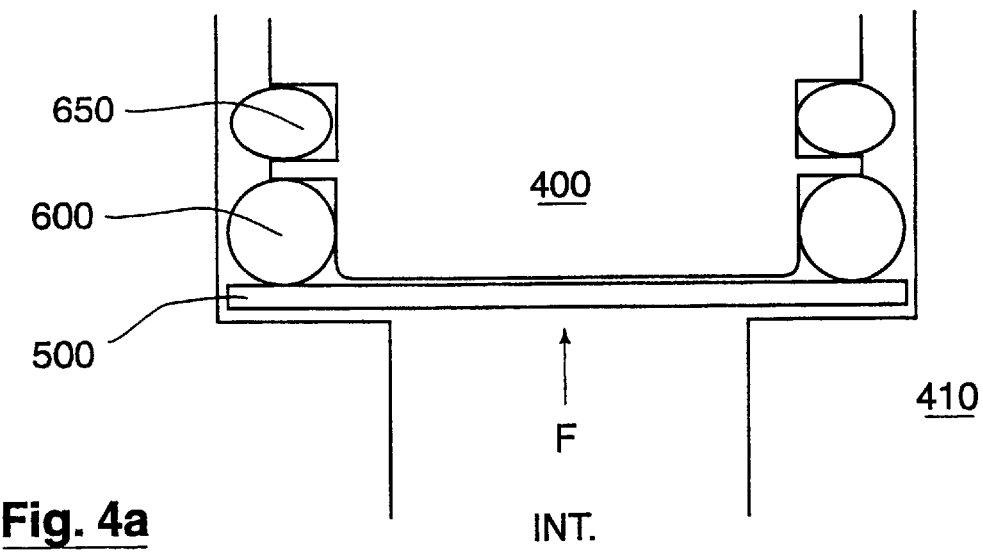
Fig. 4a
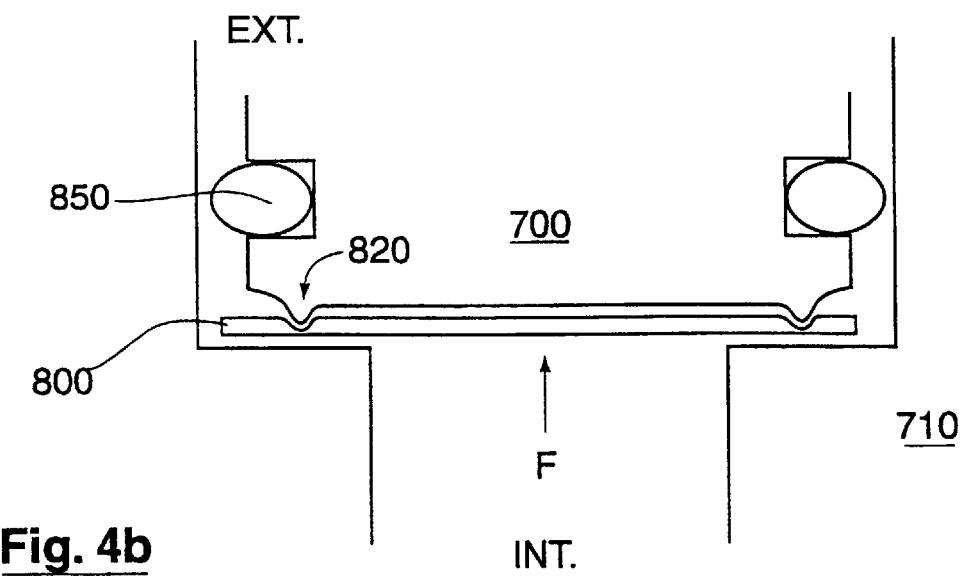
Fig. 4b
FIG. 4

SEALING METHOD, NEW SEAL FOR COMPONENTS OF FLUID TRANSFER SYSTEMS, ESPECIALLY TUBES, AND THEIR APPLICATIONS, ESPECIALLY IN PUMPS AND CIRCUITS FOR SPECIAL FLUIDS

BACKGROUND OF THE INVENTION

1. Technical Field

The present invention concerns the technical sector of seals included in fluid transfer systems and more particularly seals for tubes and generally circuits carrying special fluids.

2. Background Information

In this application, special fluids are understood to be fluids requiring the use of special materials. One non-restrictive example is given by corrosive fluids. Also to be denoted under this category are fluids which must not be contaminated by the components of fluid transfer systems. One non-restrictive example is provided by certain fluids used in the semiconductor industry.

The present invention also concerns the technical sector of tubes, pumps and other components of fluid transfer systems for special fluids using these seals and in particular the technical sector of pumps comprising these inlet or outlet pumps. One non-restrictive example is provided by pumps and tubes carrying fluorinated material.

In the semiconductor industry, fluids, defined here as "special", are currently used. In particular they can be bases, acids, solvents, water or watery fluids containing abrasive materials and similar substances well known to those concerned with this field.

A particularly serious technical problem concerns the circulation of fluids, such as acids, which are then used to etch silicon wafers used in the production of semiconductors. Any pollution, and particular any particulate pollution of the fluid carried, maybe detrimental to the quality of the semiconductor.

However, the systems used to carry these fluids and in particular pumps and tubes typically need to make use of seals like any system of this type.

In this field, metal seals with a studied section have been examined to improve sealing.

This particular field also includes toroidal seals universally known as "O-rings". These O-rigs are usually placed in grooves or housings and then compressed by a collar to ensure sealing. In the case of a seal between two tubes or a seal in a tube/pump body connector or another component of a fluid transfer system, tightening is effected by hand by a tightening collar.

In the technical sector in question, these seals are mainly made of elastomer materials. However, they are likely to result in a particulate contamination of the fluids carried. In fact, their purity is notoriously inadequate and can free metal or other types of particles which can be extremely damaging in "ultrapure" industries, as in the semiconductor industry.

The problem is more particularly evident in pumps carrying a fluorinated material as described earlier, the pumps comprising tubes needing to be seal connected with the aid of seals.

SUMMARY

The invention concerns a new seal forming system and is able to resolve the problems mentioned above, especially the problem of the contamination of carried fluids and in addition, and generally provides improved sealing by virtue of its particular geometry and design.

BRIEF DESCRIPTION OF THE DRAWINGS

Other characteristics and advantages of the invention shall appear more readily from a reading of the following description with reference to the accompanying drawing on which:

FIGS. 4a and 4b are diagrammatic sections of two sealing methods according to the prior art.

Figure 1:
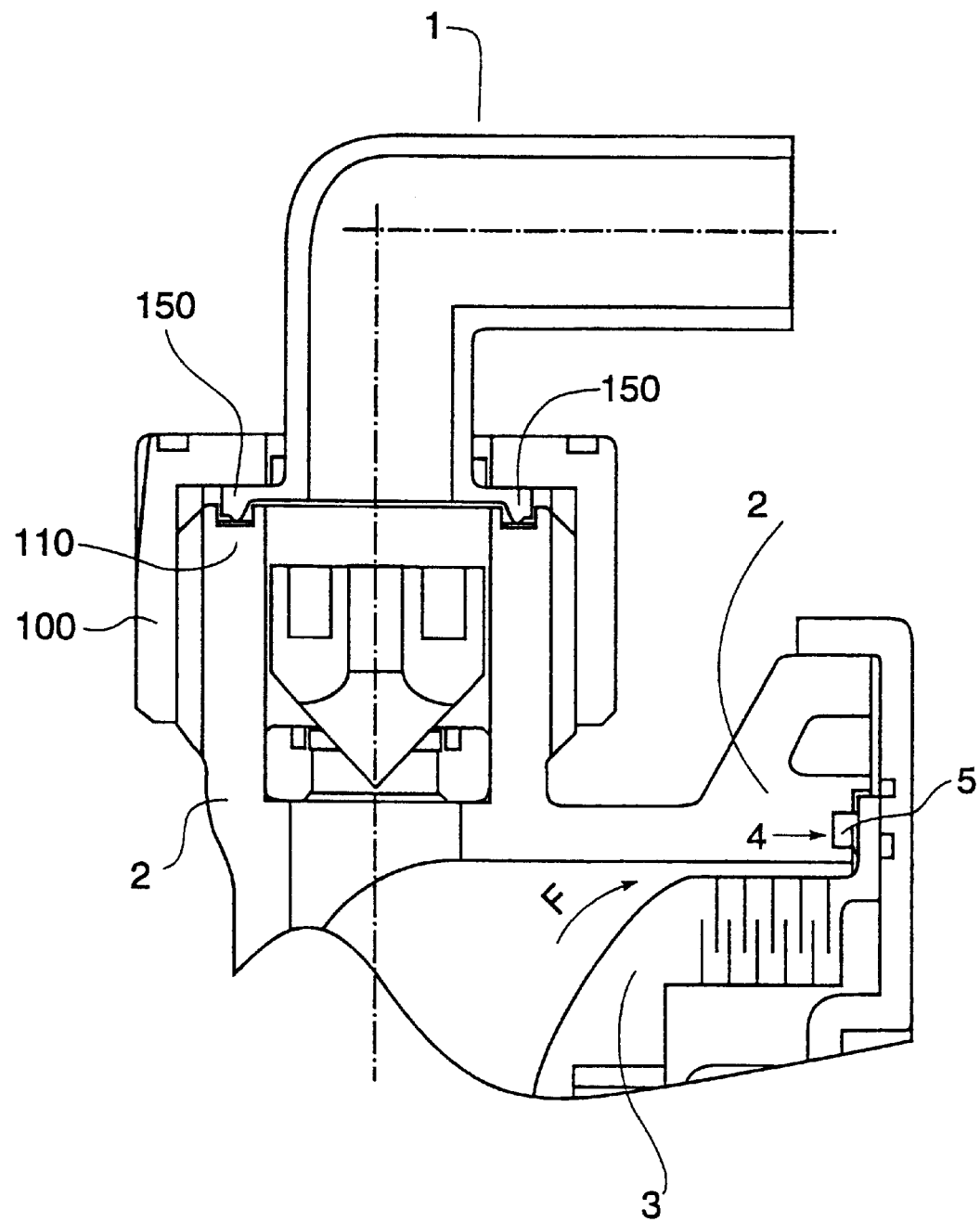
FIG. 1 is a cutaway view of a pump element for special fluids, especially an "ultrapure chemical" pump used in the semiconductor industry, and having a seal forming system according to the invention.

On the accompanying figures, the same references have the same significances which are the following:

1 tube
2 pump body
3 pump bellows
4 pump body seal housing
5 pump body seal according to the patent application filed on the same day as the present application in the name of the Applicant
100 tightening collar
110 housing of the tube seal of the invention
150 tube seal of the invention comprising a lower portion 170 and co-operating with
200 film ring or fine sealing film according to the invention at the level of the indentation zone 190
400 and 700 fixed elements of valves of the prior art
410 and 710 valve body of the prior art
500 and 800 sealing film rings for valves of the prior art
600, 650, 850 conventional elastomer O-type seals or similar type
820 groove
F and arrow: fluid pressure direction on the seal system
F1 and arrow: first channel or path for passage of the fluid outside
F2 and arrow: second channel or path for passage of the fluid outside
B and arrow: direction of application of the force of the tightening collar.
INT.: Inside of the pump (fluid under pressure) (or of the valve on FIG. 4)
EXT.: Outside of the pump (or of the valve on FIG. 4).
Throughout the present invention, the abbreviations have the following significances:
PTFE polytetrafluoroethylene

DETAILED DESCRIPTION

By way of convenience and so as to orient the figures and their numeric references, the descriptions shall be given with respect to "the inside" of the pump and respectively to the "outside".

As can be seen on FIG. 1, a housing 110 is normally placed within a pump body 2.

Figure 3:
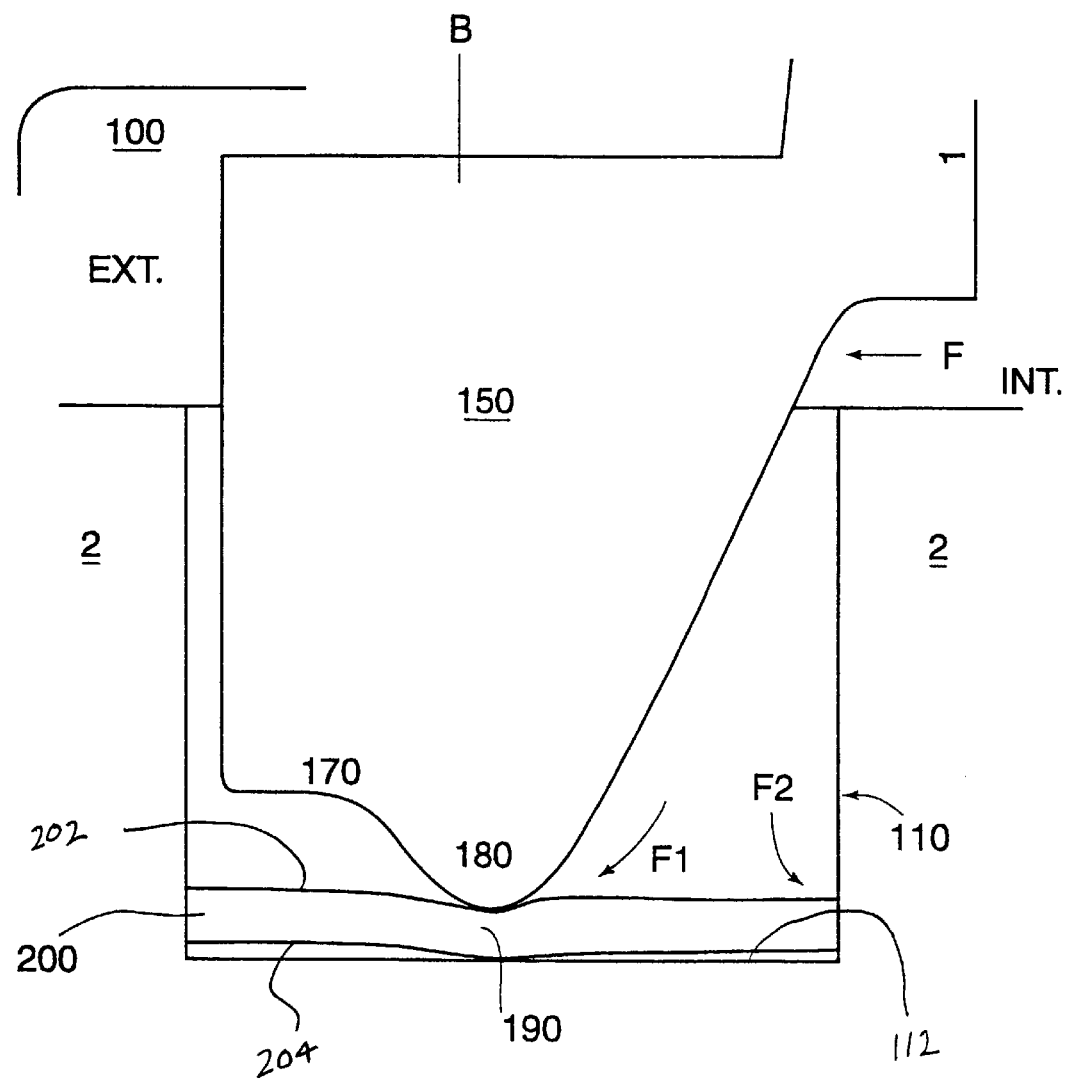
FIG. 3 is a diagrammatic section of an embodiment of the seal forming system of the invention as used on FIGS. 1 and 2.

Sealing is effected at the level of the seal 150 so as to avoid fluid F leaking outside the pump via the paths F1 or F2 (FIG. 3). The seal 150 may also be referred to herein as a sealing member. It should be noted that the terms seal and sealing member are not used in a manner consistent with the dictionary definition of the term "gasket", i.e., a deformable material used to make a joint gas or liquid tight. In contrast, the seal or sealing member of the present invention is constructed of a relatively hard material that is typically not easily compressed relative to a component joined thereto.

The invention generally concerns a method for sealing between an element made of a relatively hard material, such as a housing 110 having a seal disposed thereon, and an element 1 intended to be applied against the seal by a tightening device 100 according to which a complex system is used as a seal and formed by the combination of i) a seal 150 integral with the element 1 or rested on the element 1 and made of a relatively hard material, ii) a film ring or fine film 200 made of a relatively hard material, said seal 150 comprising a support protuberance 180 on its face 170 intended to co-operate in the indentation zone 190 with the film ring or fine film 200, and iii) a seat 112 of the housing 110, also made of a relatively hard material.

According to a preferred embodiment, the seal 150 appears in a cross section like a closed asymmetrical shape comprising at the lower part a "V" shape which forms a protuberance 180 (FIG. 3) with respect to the lower portion 170, the "V" shape preferably having a rounded contour as shown on the accompanying drawing and asymmetrically only occupying one portion of the lower face 170, also as shown, whereas one of the branches of the "V" continues asymmetrically, thus forming one of the lateral walls of the seal 150.

An expert in this field could easily envisage other similar shapes having the same function, especially the co-operation function with the film ring 200 in the indentation zone 190.

The three materials are preferably identical for the element 2 (that is the seat 112 of the housing 110), the seal 150 and the film ring or fine film 200.

As can be seen in FIG. 3, the protuberance 180 is intended to form a double indentation in the zone 190 of the film ring or fine film 200 providing two sealing lines against the paths F1 and F2. The term 'double indentation' refers to a deflection of each surface 202 and 204 of film 200, as shown. These deflections thus provide a fluid-tight surface-to-surface engagement between the protuberance 180 and surface 202 of the film 200, and between surface 204 of the film 200 and the seat 112, respectively. As also shown, the engagement of protuberance 180 and surface 202 of the film effectively prevents fluid F from passing therebetween, i.e., blocking path F1. Similarly, the surface-to-surface engagement of surface 204 with seat 112 in the zone 190 effectively prevents fluid F from flowing past the periphery of the film 200 (as indicated by F2) and between the seat 112 and film 200.

According to a preferred embodiment of the invention, the material constituting the element 2, the seal 150 and the film ring of fine film 200 is a PFA.

It is also possible to consider using polymers whose hardness characteristics and resistance to compression are situated in a range combining the characteristics of the PFA with those of PVDF.

According to a particular embodiment, the PFA is one sold by Du Pont de Nemours under the name of Teflon PFA (™).

The resistance to compression values at the yield point according to the standard ASTM D 695 are respectively:

24 Mpa for Teflon PFA™—relatively hard material—and 12 Mpa for Teflon PTFE™—relatively soft or flexible material.

The Shore D hardness values according to the standard ASTM D 2240 would respectively be:

60 for Teflon PFA™—relatively hard material—and 55 for Teflon PTFE (™) which is a relatively flexible or soft material.

By way of comparison, an FEP (ethylene-propylene fluorine resin) would have a resistance to compression of 15.2 Mpa and a Shore hardness of 56–57 according to the same standards.

A PVDF (polyvinylidene fluoride) has a resistance to compression of 75 Mpa and a Shore hardness of 77 according to the same standards.

These values shall enable an expert in this field to evaluate what the invention means concerning a "relatively hard" material in relation to the resistance to compression and Shore D hardness value difference which, although seeming numerically low, is considerable. A specialist in this field would therefore select the appropriate materials and determine the acceptable "hardness" ranges.

In the prior art, there are two valve technology systems that are shown on FIGS. 4a and 4b.

On FIG. 4a, sealing is ensured by two conventional lateral toroidal seals 600, 650, i.e., O-rings, made of elastomer and by a film ring 500, which rests on the seat of the valve. As can be seen, the fluid pressure is exerted on the face of the film ring.

On FIG. 4b, sealing is ensured by a conventional lateral toroidal seal 850 and by a film ring 800 on which the fixed element of the valve 700 is tightened by means of a ridge 820 which marks the film ring with its imprint. The fluid pressure is exerted on the bottom of the film ring shown also on FIG. 4b.

In these two cases, the valve body 410 or 710 and the film ring 500 or 800 are made of PFA. On the other hand, the fixed elements of the valves 400 and 700 are made of a material harder than PFA, namely PVDF.

Thus, it was not obvious that the technology of FIG. 4b can be transposed to a technology for tubes, especially tubes of fluorinated materials, such as according to the present invention, in which the pressure of the fluid is exerted on the top and not the bottom of the film ring or fine film. In addition, the support element of FIG. 4b is harder than the PFA of the film ring. Thus, the unpredictability of sealing behavior was increased. The fact that the valve configuration of FIGS. 4a and 4b have been in use for 10 or 20 years whereas the problem posed by the sealing of tube connectors for special fluids has-still not been resolved confirms that the technology of the present invention was not used in this field when the need existed.

According to the invention, the seal 150 made of a relatively hard material shall preferably be an extension of the element 1 that needs to be seal-connected to the element 2. In the prior art using flexible elastomer seals, it was clearly impossible to embody a tube made of the same elastomer material. According to the invention, this is now possible since the three components combined to form the joint are made of a relatively hard material.

According to a less preferred variant of the invention, the three components shall be made of a relatively hard material with the elements 110 and/or 150 being able to be harder than the element 200.

The film ring must be sufficiently hard to prevent the system from leaking.

One of the important advantages of the invention is thus of providing forming a seal as a simple extension of one of the elements to be connected. A preferred embodiment of the present invention uses one of the elements to be connected to serve as the seal.

An expert in this field shall understand that this preferred variant of the invention is quite contrary to the instructions of the prior art, whether it concerns valves, pumps or tubes made of fluorinated materials.

Figure 2:
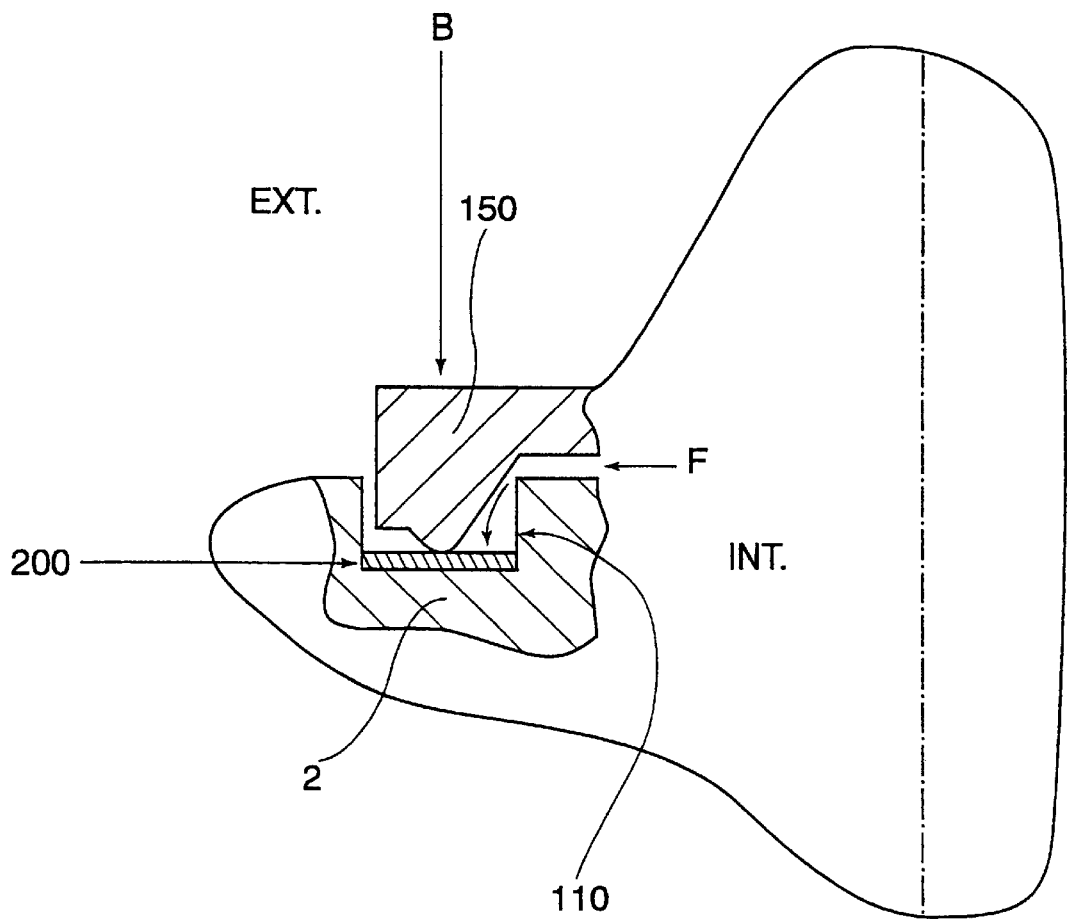
FIG. 2 is a sectional view on larger scale of a portion of FIG. 1 and showing an embodiment of the seal forming system of the invention and the elements surrounding it.

According to the preferred embodiment of FIG. 1 or 2, the element 2 is a pump body, especially a pump made of a relatively hard fluorinated material, such as PFA, and the element 1, integral with the seal 150 which is a simple extension of it, is an inlet or outlet tube made of PFA, whereas the film ring or fine film 200 is also made of PFA.

Comparative tests have shown that, without any film ring or fine film 200, the system of the invention leaks. The two elements to be connected (in particular in the preferred example the pump body 2 and the tube 1 extended by the element 150) thus co-operate fully with the film ring of fine film 200. These tests also surprisingly show that the imperviousness of the system of the invention, depends on a film ring which would not have logically bound to play this decisive role and which, if reference is made in particular to the prior art of FIG. 4, should previously co-operate with one or several elastomer seals.

The advantage of the fine film ring 200 also derives from the fact that it is the only warped element and thus the only element to be replaced during maintenance.

The invention further concerns seal forming systems described above, including their variants.

The invention further concerns the applications of the method of the invention and seal forming systems of the invention in all industries having strict or even drastic sealing criteria, such as the semiconductor industry, and generally the electronics, aeronautics and space, pharmaceutical, chemical industries and new technological and similar industries.

In particular, the invention concerns pumps and tubes for carrying special fluids, especially corrosive fluids, and/or in particular corrosive, and/or in particular fluids not having to be contaminated by the seal, characterised in that they comprise at least one sealing system or seal forming system as described above and in that the two elements to be connected are directly used to take part in the seal forming system.

The invention further concerns implementation, embodiment and materials selection variants, and applications and uses directly accessible to specialists in this field from a reading of the present description.

What is claimed is:

1. A method for effecting a seal between a housing made of a relatively hard material and an element adapted to be disposed on the housing, said method comprising:
   providing a film made of relatively hard material;
   providing a sealing member integral with the element, the sealing member being made of a relatively hard material;
   the sealing member including a support protuberance on a face thereof, the support protuberance adapted for cooperative engagement with the film;
   disposing the film on a seat portion of the housing, the seat being made of a relatively hard material;
   engaging the support protuberance portion of the sealing member with the film.

2. The method of claim 1 further comprising tightening the sealing member against the film.

3. The method of claim 1 wherein the sealing member, the film, and the housing are made of relatively hard materials and have substantially equal hardness values.

4. The method of claim 1 wherein the sealing member, the film, and the housing are fabricated from the same materials.

5. The method of claim 4 wherein the sealing member, the film, and the housing are fabricated from polyfluoroalkoxy.

6. The method of claim 1 wherein the sealing member, the film, and the housing are fabricated from polymeric materials having Shore D hardness values ranging from about 60 to about 77 and resistance to compression values at the yield point ranging from about 24 to about 75 MPa.

7. The method of claim 6 wherein the sealing member, the film, and the housing are fabricated from a polymeric material having a shore D hardness value of about 60 and a resistance to compression value at the yield point of about 24 MPa.

8. The method of claim 6 wherein the sealing member, the film, and the housing are fabricated from a polymeric material having a shore D hardness value of about 77 and a resistance to compression value at the yield point of about 75 MPa.

9. The method of claim 1 wherein the support protuberance comprises a rounded contour.

10. The method of claim 9 wherein the sealing member comprises a cross section having a closed asymmetrical form, the support protuberance including a rounded "V" shape and asymmetrically occupying a portion of a face of the sealing member, wherein one of the branches of the "V" continues asymmetrically thereby forming one of the lateral walls of the seal.

11. The method of claim 1 wherein said engaging the support protuberance potion of the sealing member with the film deflects both surfaces of the film, providing for sealing between the protuberance and the film, and between the film and the housing.

12. The system of claim 11 wherein said sealing member, said film, and said seat are made of relatively hard materials and have substantially equal hardness values.

13. A pump comprising at least one seal forming system according to claim 12.

14. The system of claim 11 wherein said sealing member, said film, and said seat are fabricated from the same material.

15. The system of claim 14 wherein said sealing member, said film, and said seat are fabricated from polyfluoroalkoxy.

16. The system of claim 14 wherein said sealing member, said film, and said seat are fabricated from polymeric materials having Shore D hardness values ranging from about 60 to about 77 and resistance to compression values ranging from about 24 to about 75.

17. The system of claim 11 wherein said support protuberance comprises a rounded contour.

18. The system of claim 17 wherein said sealing member comprises a cross section having a closed asymmetrical form, said support protuberance including a rounded "V" shape and asymmetrically occupying a portion of a face of said sealing member, wherein one of the branches of the "V" continues asymmetrically thereby forming one of the lateral walls of the seal.

19. A pump comprising at least one seal forming system according to claim 18.

20. The method of claim 11 wherein the element is a tube configured for disposition on a pump housing, and the sealing member is an integral part of the tube.

21. A seal forming system for effecting a seal between a housing made of a relatively hard material and a element sized and shaped for engagement with said housing, the system comprising:

a film made of a relatively hard material;

a sealing member disposed integrally with the element, said sealing member being made of a relatively hard material;

said sealing member including a support protuberance disposed on a face thereof, said support protuberance being engaged with a surface of said film; and a seat portion of the housing disposed in engagement with an other surface of said film, said seat being made of a relatively hard material.

22. A pump comprising at least one seal forming system according to claim 21.

23. A pump adapted for use in an industry having strict sealing criteria, the industry being selected from the group consisting of semiconductor industries, electronics industries, aeronautic industries, space industries, chemical industries, and pharmaceutical industries, said pump comprising at least one seal forming system for effecting a seal between a housing made of a relatively hard material and an element configured for being fastened to the housing, the system including:

a film made of a relatively hard material;

sealing member integral with said element, said sealing member being made of a relatively hard material;

said sealing member including a support protuberance on a face thereof, said support protuberance adapted for cooperative engagement with said film; and a seat portion of said housing being engaged with said film, said seat portion being made of a relatively hard material.

24. A pump comprising at least one seal forming system for effecting a seal between a housing and a tube sized and shaped for being fastened to said housing, the system including:

a film;

a sealing m ember being an integral part of said tube;

said sealing member including a support protuberance on a face thereof, said support protuberance adapted for cooperative engagement with said film and including a rounded contour;

said film, said sealing member, and said housing being fabricated from a relatively hard polymeric material and having substantially equal hardness values;

said polymeric material having a Shore D hardness value ranging from about 60 to about 77 and a resistance to compression value ranging from about 24 to about 75 MPa; and a seat portion of said housing being engaged with said film.

\* \* \* \* \*